(12) United States Patent
Ummethala

(10) Patent No.: US 12,204,147 B2
(45) Date of Patent: Jan. 21, 2025

(54) INTEGRATED ON-CHIP POLARIZATION ROTATION SPLITTER

(71) Applicant: Scantinel Photonics GmbH, Ulm (DE)

(72) Inventor: Sandeep Ummethala, Karlsruhe (DE)

(73) Assignee: Scantinel Photonics GmbH, Ulm (DE)

( * ) Notice: Subject to any disclaimer, the term of this patent is extended or adjusted under 35 U.S.C. 154(b) by 0 days.

(21) Appl. No.: 17/511,361

(22) Filed: Oct. 26, 2021

(65) Prior Publication Data

US 2023/0127941 A1 Apr. 27, 2023

(51) Int. Cl.
*G02B 6/126* (2006.01)
*G01S 7/481* (2006.01)
*G01S 17/42* (2006.01)
*G02B 6/12* (2006.01)

(52) U.S. Cl.
CPC ............ *G02B 6/126* (2013.01); *G01S 7/4817* (2013.01); *G01S 17/42* (2013.01); *G02B 2006/12061* (2013.01); *G02B 2006/1215* (2013.01)

(58) Field of Classification Search
CPC .......... G02B 6/126; G02B 2006/12061; G02B 2006/1215; G01S 7/4817; G01S 17/42
See application file for complete search history.

(56) References Cited

U.S. PATENT DOCUMENTS

| 10,545,288 | B2 | 1/2020 | Ma et al. |
| 10,983,200 | B1* | 4/2021 | Shen ................... G02B 6/1228 |
| 11,061,123 | B1 | 7/2021 | Shen et al. |
| 2014/0133796 | A1 | 5/2014 | Dong et al. |
| 2015/0338577 | A1 | 11/2015 | Shi et al. |
| 2016/0246005 | A1* | 8/2016 | Liu ........................ G02B 6/126 |
| 2017/0227710 | A1 | 8/2017 | Lamponi et al. |

(Continued)

FOREIGN PATENT DOCUMENTS

CN 114624815 A 6/2022

OTHER PUBLICATIONS

Wesley D. Sacher, Tymon Barwicz, Benjamin J. F. Taylor, and Joyce K. S. Poon, "Polarization rotator-splitters in standard active silicon photonics platforms," Opt. Express 22, 3777-3786 (2014).

(Continued)

*Primary Examiner* — John Bedtelyon
(74) *Attorney, Agent, or Firm* — Morgan, Lewis & Bockius LLP

(57) ABSTRACT

An integrated on-chip polarization rotator splitter (26) comprises a waveguide polarization rotator (54) having a first and a second layer (62) that form a rib waveguide (66) together and are both made of silicon nitride. The first layer (62) has a first, a second and a third section. The first layer (64) has a first width ($w_1$) that increases in the first section (S1), is constant in the second section (S1) and decreases in the third section (S3). The second layer (64) has a second width ($w_2$) that continuously increases. The polarization rotator splitter (26) further includes a waveguide polarization splitter (61) comprising a first strip waveguide (71) and a second strip waveguide (72) that are separated by a gap (74). The first and second strip waveguides (71, 72) are also made of silicon nitride. The first and second strip waveguide (71, 72) form an asymmetric evanescent direction coupler.

17 Claims, 2 Drawing Sheets

(56) References Cited

U.S. PATENT DOCUMENTS

2020/0096700 A1    3/2020  Park et al.

OTHER PUBLICATIONS

Scantinel Photonics GmbH, EP22196020.6, Extended European Search Report, Mar. 17, 2023, 7 pgs.
Sacher, Wesley D., et al. "Polarization rotator-splitters and controllers in a Si 3 N 4-on-SOI integrated photonics platform." Optics express 22.9 (2014): 11167-11174, 8 pgs.

* cited by examiner

INTEGRATED ON-CHIP POLARIZATION ROTATION SPLITTER

BACKGROUND OF THE INVENTION

1. Field of the Invention

The invention generally relates to an integrated on-chip polarization rotator splitter (PRS) that combines the functionalities of a splitter and a polarization rotator. PSRs are important components for polarization management in light detection and ranging (LiDAR) systems or data links. The current invention particularly relates to a PRS envisaged to be used in conjunction with an edge coupler in an FMCW LiDAR scanning device.

2. Description of the Prior Art

Manipulation of the state of polarization (SOP) of an optical signal is crucial for many applications. In free-space optics, this is usually achieved using birefringent crystals that feature polarization-dependent phase velocities. Similarly, an inherent birefringence of integrated optical waveguides may be exploited to design on-chip photonic components that manipulate the SOP of optical signals traversing a photonic integrated circuit (PIC).

One important application in which the state of polarization (SOP) is often managed are FMCW LiDAR scanning device that optically measure distances and velocities. In FMCW LiDAR systems, optical signals with a time-varying frequency (FMCW stands for Frequency Modulated Continuous Wave) are directed in different directions onto an object to be measured. After reflection at the object, the optical signals return to the scanning device with low intensity and are superimposed with a signal that was not emitted (usually referred to as a local oscillator signal). The resulting beat frequency is detected by a detector and allows the distance between the scanning device and the object to be calculated. If the Doppler shift is taken into account, the relative radial velocity between the scanning device and the object can be calculated, too.

FMCW LiDAR scanning devices that are at least partially implemented as photonic integrated circuits are very robust, small and can be fabricated at low costs. In a typical setup for such photonic FMCW LiDAR scanning devices, an optical signal with a transverse-electric (TE) field exits the PIC via an edge coupler to reach the object. The return optical signal, scattered from the target, is transformed into a transverse-magnetic (TM) mode using free-space optics. The returning TM-polarized optical beam is coupled back into the PIC using the same edge coupler, splitted from the forward propagating TE-polarized optical signal and routed to an on-chip photodiode. As photodiodes usually feature better responsivities for TE-polarized optical signals, the returning TM-polarized optical signal is converted to TE polarization before transducing it into electrical domain.

Most of the available on-chip solutions for polarization management are based on silicon photonic waveguides. See, for example, Wesley D. Sacher, Tymon Barwicz, Benjamin J. F. Taylor, and Joyce K. S. Poon, "Polarization rotator-splitters in standard active silicon photonics platforms," Opt. Express 22, 3777-3786 (2014). This paper proposes a PRS comprising a bi-level taper for TM0-TE1 mode conversion and a symmetric SiO2 cladding. After the bi-level taper, the TE0 and TE1 modes are separated into two waveguides using an adiabatic coupler.

However, silicon photonic waveguides are limited in the optical power they can carry. Furthermore, tight fabrication tolerances of structuring silicon photonic components adversely affect device performance.

In order to overcome these restrictions, it has been proposed to use silicon nitride (SiN) rib waveguides. See, for example, US 2020/0096700 A1 and in particular U.S. Pat. No. 10,983,200 B1. However, these components suffer from high insertion loss and do not enable a full mode hybridization between TM0 and the TE1 modes.

SUMMARY OF THE INVENTION

It is therefore an object of the present invention to provide an integrated on-chip polarization rotator splitter (PRS) having a small insertion loss and enabling a full mode hybridization between the TM0 and the TE1 modes.

This object is achieved, in accordance with the present invention, by an integrated on-chip polarization rotator splitter (PRS) comprising a waveguide polarization rotator having a first end and a second end. The PRS comprises a first layer and a second layer that form a rib waveguide together and are made of silicon nitride. The first layer has a first section, a third section and a second section arranged between the first section and the third section. The first layer has a first width that increases in the first section starting from the first end, is constant in the second section and decreases in the third section starting from the second section. The second layer has a second width that continuously increases from the first end to the second end. The PSR further comprises a waveguide polarization splitter comprising a first strip waveguide and a second strip waveguide that is separated from the first strip waveguide by a gap. The first strip waveguide and the second strip waveguide are made of silicon nitride, and the first strip waveguide and the second strip waveguide form an asymmetric evanescent direction coupler.

The polarization rotator of the PRS according to the present invention thus features three sections designed to tailor the mode transformation. The silicon nitride waveguide core is tapered all along the length of the rotator from the first through the third section. In the first section, the width of silicon nitride slab (partially etched silicon nitride) is tapered up to a specific width, following which, in the second section, the width of the silicon nitride slab is maintained constant while the waveguide core continues to taper up. Such a design has specific advantages.

Firstly, a quick up-ramp in taper width of the slab along with the up-ramp of the rib width has little impact on the TE0 mode and influences the hybridization of TM0 mode. Apart from reducing the overall insertion loss, such a design of the first section enables a complete mode-transformation in the second section.

Secondly, the constant width of the silicon nitride slab and the adiabatic increase in the width of the waveguide core in the second section enables a complete mode transformation of TM0 into TE1 mode. This is an important condition for a maximum modal dependent splitting effect in the subsequent waveguide polarization splitter.

In an embodiment, the first width and the second width are equal at the first end. However, a certain width mismatch can usually be tolerated. The same also applies to the first width and the second width at the second end.

In an embodiment, the first strip waveguide comprises a first portion and a second portion, wherein the first portion is connected to the first layer and to the second layer of the waveguide polarization rotator, and wherein the first strip waveguide has a third width that is constant in the first portion and decreases in the second portion starting from the first portion.

In an embodiment, the second strip waveguide comprises a third portion and a fourth portion, wherein the third portion is arranged contiguous to the first layer of the waveguide polarization rotator and parallel to the first strip waveguide, and wherein the second strip waveguide has a single or double bend in the fourth portion to increase a width of the gap.

In this embodiment, the second strip waveguide may have a fourth width that is constant in the first portion and in the second portion, and the fourth width may be smaller than the third width of the first strip waveguide in the first portion.

In an embodiment, the PSR comprises a substrate, wherein the first layer extends between the substrate and the second layer. In this embodiment, the first layer may have a first thickness and the second layer may have a second thickness that is equal to or smaller than the first thickness.

Subject of the invention is also a photonic integrated circuit, comprising the polarization rotator splitter outlined above and an edge coupler that is optically connected to the second silicon nitride layer at the first end of the waveguide polarization rotator.

In an embodiment, the edge coupler comprises a silicon nitride strip waveguide having a rectangular, and in particular a square, cross-section. It should be noted, however, that structures intended to be perpendicular to the substrate will often, due to the lithographic fabrication process, be inclined. Therefore, a cross-section that should be rectangular will actually look more trapezoidal with chamfered edges.

In embodiment, the edge coupler has a TE coupling efficiency for TE polarized light and a TM coupling efficiency for TM polarized light that differs from the TE coupling efficiency by less than 10%.

BRIEF DESCRIPTION OF THE DRAWINGS

Various features and advantages of the present invention may be more readily understood with reference to the following detailed description taken in conjunction with the accompanying drawings in which.

DETAILED DESCRIPTION OF EMBODIMENTS

1. Application Scenario

Figure 1:
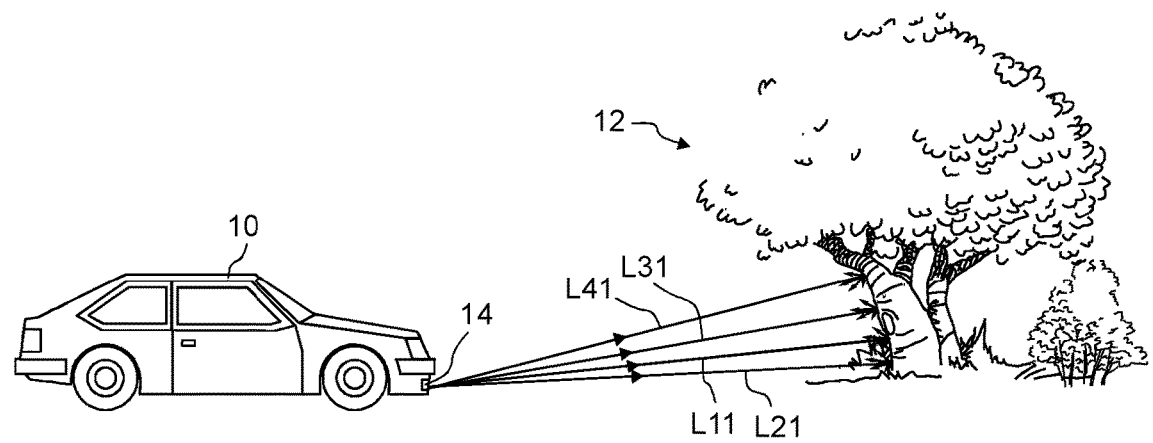
FIG. 1 is a schematic side view of a vehicle approaching an object which is detected by a scanning device according to the invention.

FIG. 1 is a schematic side view of a vehicle 10 approaching an object 12 that is represented by a tree. The vehicle 10 has at least one scanning device 14 that uses light beams L11, L21, L31 and L41 to scan the environment ahead of the vehicle 10. From the distance information generated by the scanning device 14 a three-dimensional image of the environment can be calculated. In addition, the scanning device 14 determines the relative speed to the object 12. This information is particularly important if the object 12 is another vehicle, an animal or a pedestrian that is also moving.

Figures 2, 4:
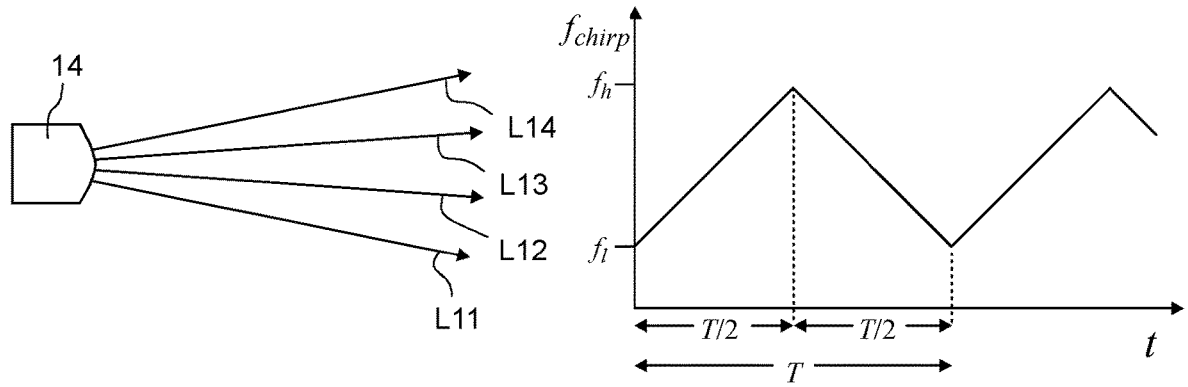
FIG. 2 is a top view of the scanning device shown in FIG. 1.
FIG. 4 is a graph illustrating the time dependency of the frequency of the light emitted by a light source that is contained in the scanning device.

As can be seen in FIG. 1, the scanning device 14 emits light beams L11 to L41 in different directions in a vertical plane (in FIG. 1 this is the paper plane) in order to scan the environment in a vertical direction. Scanning takes place also in a horizontal direction, as this is shown in FIG. 2 which is a top view on the scanning device 14. Four light beams L11, L12, L13 and L14 are shown which are emitted in different directions in a horizontal plane.

For reasons of clarity, it is assumed in FIGS. 1 and 2 that only four light beams Ln1 to Ln4 in four different planes—i.e. a total of 16 light beams—are generated by the scanning device 14. However, in reality the scanning device 14 emits significantly more light beams. For example, $k \cdot 2^n$ light beams are preferred, where n is a natural number between 7 and 13 and indicates how many beams are emitted in one of k planes, where k is a natural number between 1 and 16. In some embodiments, more than one light beam is emitted at a given time in order to achieve the desired spatial and temporal resolution.

2. Scanning Device

Figure 3:
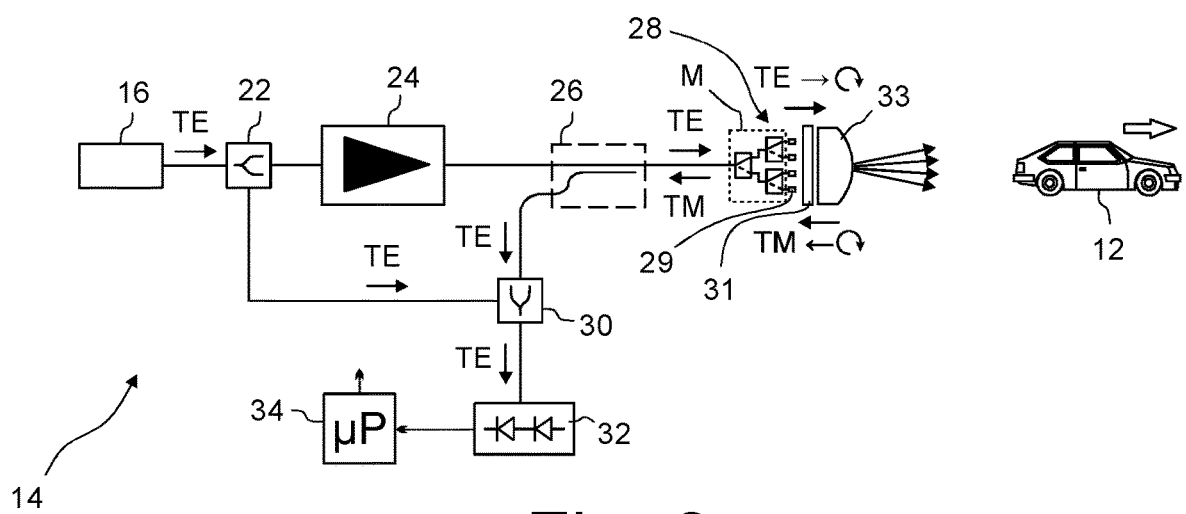
FIG. 3 schematically shows the design of the scanning device according to an embodiment.

FIG. 3 schematically shows the basic design of the scanning device 14 according to an embodiment of the invention. The scanning device 14 is designed as a LiDAR system and comprises an FMCW light source 16 which generates measuring light in a TE0 state of polarization (SOP). The measuring light has a frequency $f_{chirp}$ that varies ("chirps") periodically over time t between a lower frequency $f_l$ and a higher frequency $f_h$.

In the embodiment shown, each measurement interval with a chirp duration T is divided into two halves of equal length T/2. During the first interval the frequency $f_{chirp}$ increases linearly with a constant and positive upchirp rate $r_{chirp} = f_{chirp}/dt$. During the second interval, the frequency $f_{chirp}$ decreases linearly with a constant negative downchirp rate $-r_{chirp}$. The frequency of the measured light can thus be described by a periodic triangular function. However, other functional relationships are also contemplated, e.g. sawtooth functions.

The light source 16 is connected to a splitter 22 that splits the measuring light into reference light (also referred to as local oscillator) and output light. In the illustrated embodiment, the output light is amplified by an optical amplifier 24 and is then guided to a polarization rotator-splitter 26 that directs the amplified output light, which is still in a TE0 SOP, to a deflection unit 28.

The deflection unit 28 directs the output light onto the object 12—represented in FIG. 3 by a moving car—along different directions, as it has been explained above with reference to FIGS. 1 and 2. To this end, the deflection unit 28 comprises, in the embodiment shown, a switch matrix M that selectively directs the output light to one of a plurality of output waveguides each terminating in an edge coupler 29. The edge couplers 29 form a linear array that is arranged in a front focal plane of collimating optics 31. The direction of output light emitted from the collimating optics 31 depends on the distance of the respective edge coupler 29 from the optical axis of the collimating optics 31, as this is known as such in the art.

In other embodiments, the scanning device 14 is a multi-channel device comprising a plurality of polarization rotator-splitters 26 each being associated with a single edge coupler 29 or with a group of edge couplers 29. In particular, each polarization rotator-splitter 26 may be directly connected to an associated edge coupler 29. With respect to possible locations of the polarization rotator-splitters 26 in an FMCW LiDAR PIC, reference is made to European patent application No. 21168784.3 filed on Apr. 16, 2021. The full disclosure of this earlier application is incorporated herein by reference.

Referring again to FIG. 3, a quarter-wave plate 33 is arranged between the edge couplers 29 and the collimating optics 31. The quarter-wave plate 33 transforms the TE0 SOP of the emitted output light into a circular SOP, as this is indicated in FIG. 3 by symbols.

The output light emitted by the deflection unit 28 is at least partially diffusely reflected at the object 12. A small portion of the reflected light thus returns to the deflection unit 28, where it passes the quarter-wave plate 33 again and is re-coupled into the edge couplers 29. The quarter-wave plate 33 transforms the circular SOP of the reflected light into a TM0 SOP, as this is indicated in FIG. 3 by symbols.

The polarization rotator-splitter 26 separates the reflected light TM0 mode from the output light TE0 mode traveling in the waveguide along the opposite direction. Furthermore, it simultaneously transforms the TM0 mode of the reflected light into a TE0 mode, as this will be explained in more detail below with reference to FIGS. 5 and 6. The reflected and split-off light, now again in a TE0 SOP, is directed to a combiner 30 where it is superimposed with the reference light that has been separated from the measurement light by the splitter 22. Since the frequencies of the superimposed light components are slightly different due to the different optical path lengths, a beat signal is generated which is detected by a symmetrical photodetector or another type of detector 32. The electrical signals generated by the detector 32 are fed to a calculation unit 34, which calculates the distance R and the relative radial velocity v to the object 12 on the basis of the detected beat frequencies.

With the exception of the quarter-wave plate 33 and the collimating optics 31, all components shown in FIG. 3 and described in the foregoing are integrated in a photonic integrated circuit (PIC).

3. Polarization Rotator-Splitter

Figure 5:
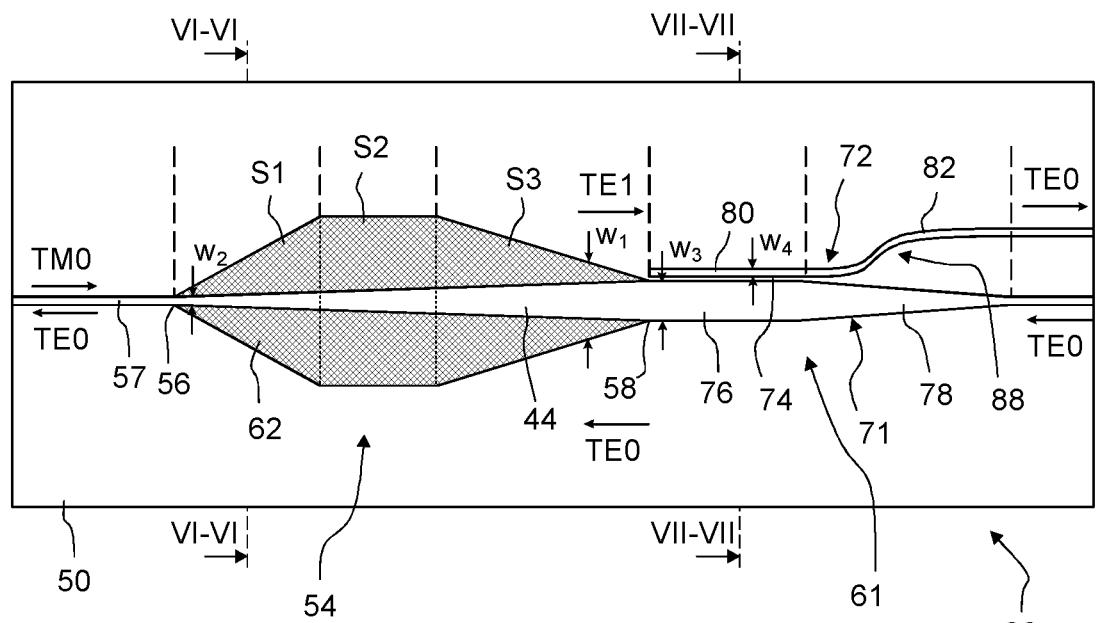
FIG. 5 is a top view on a polarization rotator-splitter in accordance with an embodiment of the invention and contained in the scanning device shown in FIG. 4.
Figure 6:
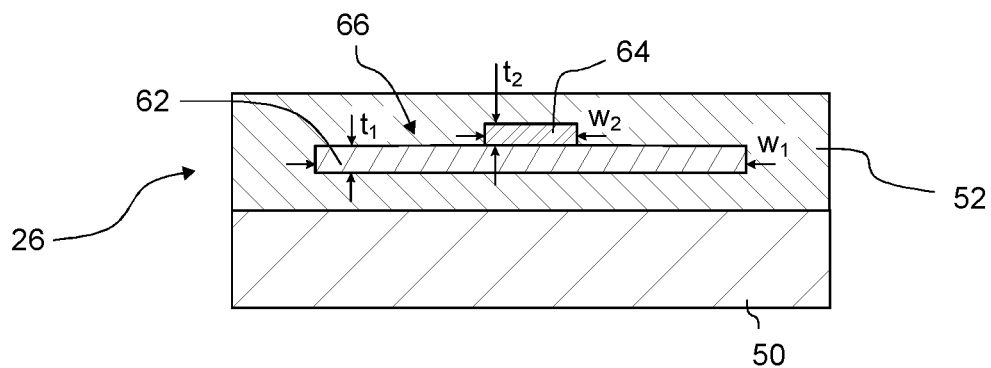
FIG. 6 is a cross-section through the polarization rotator-splitter shown in FIG. 5 along line VI-VI.
Figure 7:
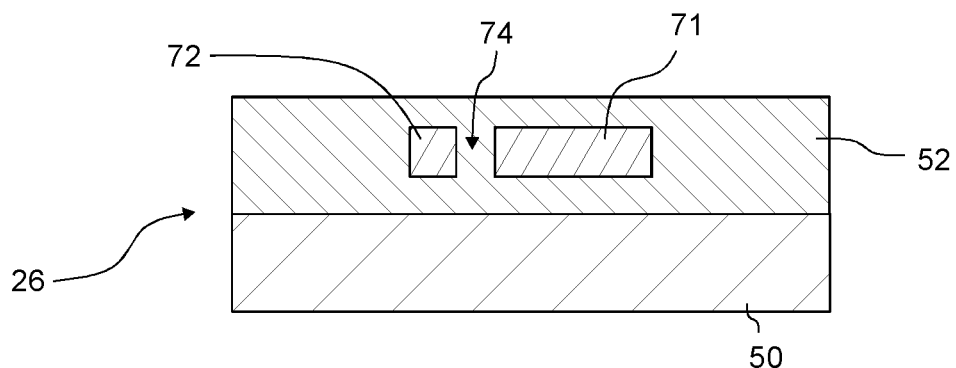
FIG. 7 is a cross-section through the polarization rotator-splitter shown in FIG. 5 along line VII-VII.

Reference is now made to FIG. 5, which is a top view on the polarization rotator-splitter 26 without the cladding layer, and to FIGS. 6 and 7, which are cross sections through the polarization rotator-splitter 26 along lines VI-VI and VII-VII, respectively.

The polarization rotator-splitter 26 comprises a substrate 50 which may be made of silicon. On the substrate 50 waveguides are formed that are embedded in a cladding layer 52 which may be made of $SiO_2$, for example. The polarization rotator-splitter 26 has two functional units. The first unit, if seen from the left, is a waveguide polarization rotator 54 having a first end 56 and a second end 58. The first end 56 is connected to waveguide 57 leading to the switch matrix M. The second functional unit is a polarization splitter 61 that is connected to the second end 58 of the waveguide polarization rotator 54 and comprises strip waveguides that form an asymmetric evanescent direction coupler. In the embodiment shown in FIG. 3, the two outputs of the polarization splitter 61 are connected to the optical amplifier 24 and the combiner 30, respectively.

In embodiments in which each edge coupler 29 is connected to a polarization rotator-splitter 26, the waveguide 57 may be thickness tapered so as to form the edge coupler 29. The tapered waveguide 57 then expands the mode field diameter of the light to an intended value and terminates in a taper tip having a square or rectangular cross-section and allowing similar coupling efficiencies for both TE0 and TM0-polarized light.

Both functional units, i.e. the waveguide polarization rotator 54 and the polarization splitter 61, will be explained in more detail below.

a) Polarization Rotator

As shown in FIG. 6, the polarization rotator 54 comprises a first layer 62 and a second layer 64 that together form a rib waveguide 66 and are made of silicon nitride. The first layer 62 has a thickness $t_1$ (i.e. a dimension perpendicular to the surface of the substrate 50) that is larger than the thickness $t_2$ of the second layer 64. In other embodiments, the thicknesses $t_1$ and $t_2$ are at least approximately equal.

The first layer 62 has a first section S1, a third section S3 and a second section S2 arranged between the first section 51 and the third section S3. The width $w_1$ of the first layer 62 linearly increases in the first section S1 starting from the first end 56, is constant in the second section S2 and linearly decreases in the third section S3 starting from the second section S2 and terminating at the second end 58.

The second layer 64 has a width $w_2$ that linearly increases from the first end 56 to the second end 58. At the first end 56 the widths are equal, i.e. $w_1=w_2$. Within the polarization rotator 54, $w_1>w_2$, but at the second end 58 the widths $w_1$, $w_2$ are again equal, but now have a significantly larger value than at the first end 56.

Typical values for the widths of the optical waveguides mentioned above are 0.1 to 1 μm for the optical waveguide 57 that leads either directly or via the switch matrix M (as shown in FIG. 3) to an edge coupler, 1.5 to 3.5 μm for the first layer 62 and 1.0 to 2.0 μm for the second layer 64 within the second section S2, and 1.5 to 3.0 μm for the first layer 62 and 1.2 to 3.0 μm for the second layer 64 within the third section S3. The lengths of the first, second and third sections S1, S2 and S3 may be between 100 and 400 μm. The thicknesses $t_1$, $t_2$ of the first layer 62 and the second layer 64 may each be between 0.1 and 0.3 μm.

The polarization rotator 54 is based on the concept of mode evolution. A TM0 mode entering the polarization rotator 54 at the first end 56 is first converted to a hybrid mode of TM0 and TE1 modes and then further evolves into a TE1 mode at the end of the polarization rotator 54. However, a TE0 mode travelling through the polarization rotator 54 in either direction remains unchanged in its SOP.

b) Polarization Splitter

The polarization splitter 61 comprises a first strip waveguide 71 and a second strip waveguide 72 that is separated from the first strip waveguide 71 by a gap 74. The first strip waveguide 71 and the second strip waveguide 72 are made of silicon nitride and form an asymmetric evanescent direction coupler.

The first strip waveguide 71 comprises a first portion 76 that contacts the first layer 62 and second layer 64 of the waveguide polarization rotator 54, and a second portion 78. The first strip waveguide 71 has a third width $w_3$ that is constant in the first portion 76 and linearly decreases in the second portion 78 starting from the first portion 76. A non-linear increase is also possible.

The second strip waveguide 72 comprises a third portion 80 and a fourth portion 82. The first portion 76 of the first strip waveguide 71 is parallel to and has the same length as the third portion 80 of the second strip waveguide 72. The third portion 80 of the second strip waveguide 72 is arranged contiguous to the first layer 62 of the polarization rotator 54. The second strip waveguide 72 has a double bend 88 in its fourth portion 82 so as to increase the width of the gap 74.

The second strip waveguide 72 has a fourth width $w_4$ that is constant both in the third portion 80 and in the fourth portion 82. The fourth width $w_4$ is smaller than the third width $w_3$ in the first portion 76 of the first strip waveguide 71.

Typical values for the widths of the first strip waveguide 71 are 1.5 to 3 μm in the first portion 76 and 0.8 to 1 μm in the second portion 78. The fourth width $w_4$ of the second strip waveguide 72 may be between 0.4 and 1.5 μm in both the third portion 80 and in the second portion 82. The length of the first portion 76 and of the third portion 80 may be between 10 and 50 μm, and the length of the second portion 78 and of the fourth portion 82 may be between 20 and 50 μm. The gap 74 between the first portion 76 and the third portion 80 may be around 0.1 to 0.3 μm wide.

The asymmetric evanescent direction coupler forming the polarization splitter 61 selectively couples the TE1 mode guided in the first strip waveguide 71 into the second strip waveguide 72 and simultaneously transforms the TE1 mode into a TE0 mode. Therefore, only the TE0 mode propagates in the second strip waveguide 72 that finally leads to the detector 32. A TE0 mode guided in the first strip waveguide 71 is unaffected by the adjacent second strip waveguide 72.

Towards the end of the polarization splitter 61, the first strip waveguide 71 and the second strip waveguide 72 are tapered down to a waveguide having dimensions of a single-mode waveguide. Therefore, the output light produced by the light source 16 in its original TE0 mode is guided unaffected through the polarization splitter 61 and the polarization rotator 54 towards the switch matrix M or, in other embodiments, directly to an edge coupler 29. The SOP of the reflected light entering the edge couplers 29 in a TM0 mode is converted to a TE0 mode by the polarization rotator 54. This reflected light then completely couples into the second strip waveguide 72 and is guided towards the combiner 30 where it is superimposed with the reference light (local oscillator).

The invention claimed is:

1. An integrated on-chip polarization rotator splitter, comprising
   a) a waveguide polarization rotator, wherein the waveguide polarization rotator
      has a first end and a second end; and
      comprises a first layer and a second layer that form a rib waveguide together, wherein
         the first layer and the second layer are made of silicon nitride,
         the first layer has a first section, a third section and a second section arranged between and directly abutting the first section and the third section, wherein the first layer has a first width that increases in the first section starting from the first end, is constant in the second section and decreases in the third section starting from the second section, and
         the second layer has a second width that continuously increases from the first end to the second end, and
   b) a waveguide polarization splitter comprising a first strip waveguide and a second strip waveguide that is separated from the first strip waveguide by a gap, wherein the first strip waveguide and the second strip waveguide are made of silicon nitride, and wherein the first strip waveguide and the second strip waveguide form an asymmetric evanescent direction coupler.

2. The integrated on-chip polarization rotator splitter of claim 1, wherein the first width and the second width are equal at the first end.

3. The integrated on-chip polarization rotator splitter of claim 1, wherein the first width and the second width are equal at the second end.

4. The integrated on-chip polarization rotator splitter of claim 1, wherein the first strip waveguide comprises a first portion and a second portion, wherein the first portion is connected to the first layer and to the second layer of the waveguide polarization rotator, and wherein the first strip waveguide has a third width that is constant in the first portion and decreases in the second portion starting from the first portion.

5. The integrated on-chip polarization rotator splitter of claim 4, wherein the second strip waveguide comprises a third portion and a fourth portion, wherein the third portion is arranged contiguous to the first layer of the waveguide polarization rotator and parallel to the first strip waveguide, and wherein the second strip waveguide has a single or double bend in the fourth portion to increase a width of the gap.

6. The integrated on-chip polarization rotator splitter of claim 5, wherein the second strip waveguide has a fourth width that is constant in the third portion and in the fourth portion, and wherein the fourth width is smaller than the third width of the first strip waveguide in the first portion.

7. The integrated on-chip polarization rotator splitter of claim 1, comprising a substrate, wherein the first layer extends between the substrate and the second layer.

8. The integrated on-chip polarization rotator splitter of claim 7, wherein the first layer has a first thickness and the second layer has a second thickness that is equal to or smaller than the first thickness.

9. A photonic integrated circuit, comprising the integrated on-chip polarization rotator splitter of claim 1 and an edge coupler that is optically connected to the second layer.

10. The photonic integrated circuit of claim 9, wherein the edge coupler has a transverse electric (TE) coupling efficiency for TE polarized light and a transverse magnetic (TM) coupling efficiency for TM polarized light that differs from the TE coupling efficiency by less than 10%.

11. A frequency-modulated continuous wave (FMCW) scanning device comprising a light source, the photonic integrated circuit of claim 9, a light detector and a quarter-wave plate.

12. The integrated on-chip polarization rotator splitter of claim 1, wherein the second strip waveguide comprises a third portion and a fourth portion, wherein the third portion is arranged contiguous to the first layer of the waveguide polarization rotator and parallel to the first strip waveguide, and wherein the second strip waveguide has a single or double bend in the fourth portion to increase a width of the gap.

13. The integrated on-chip polarization rotator splitter of claim 1, wherein the first width in the second section is a constant width configured to enable a mode transformation of a TM mode into a TE mode.

14. The integrated on-chip polarization rotator splitter of claim 13, wherein the TM mode comprises a TM0 mode and the TE mode comprises a TE1 mode.

15. The integrated on-chip polarization rotator splitter of claim 13, wherein the constant width is configured to enable a complete mode transformation of TM0 mode into TE1 mode.

16. The integrated on-chip polarization rotator splitter of claim 13, wherein the second layer comprises a waveguide core that tapers up in the second section.

17. The integrated on-chip polarization rotator splitter of claim 13, wherein the mode transformation of the TM mode into the TE mode is configured to enable a maximum model dependent splitting effect in the waveguide polarization splitter.

* * * * *